July 21, 1959     J. A. GAYLORD     2,895,200
SNAP FASTENER FOR STRAPS AND THE LIKE
Filed Aug. 12, 1957     2 Sheets-Sheet 1
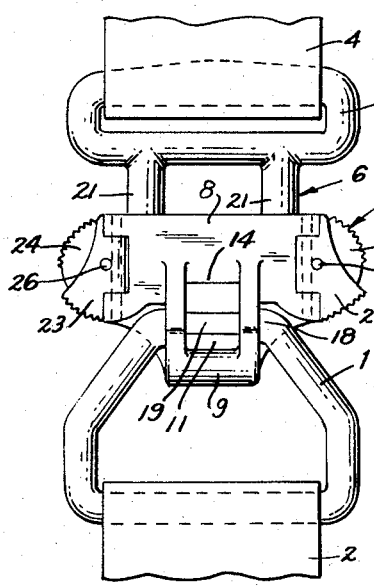
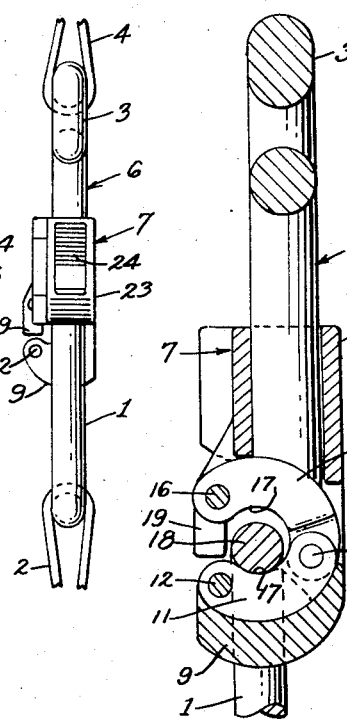
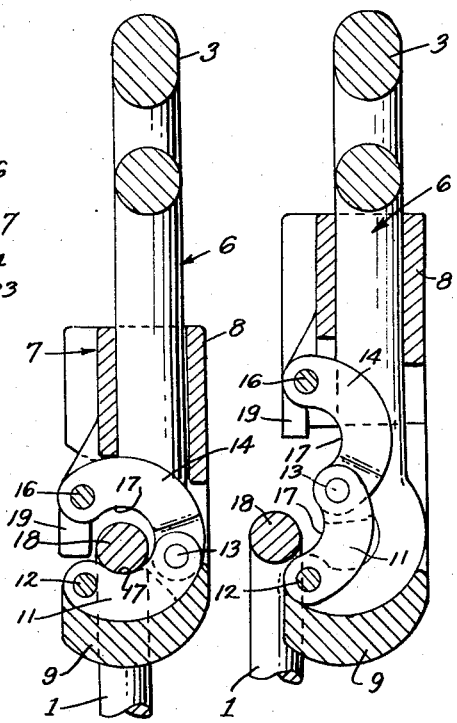
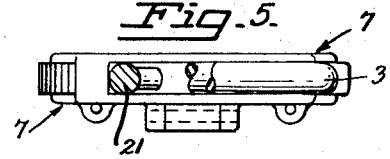
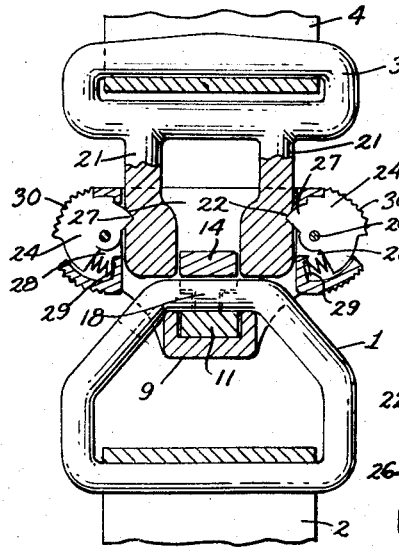
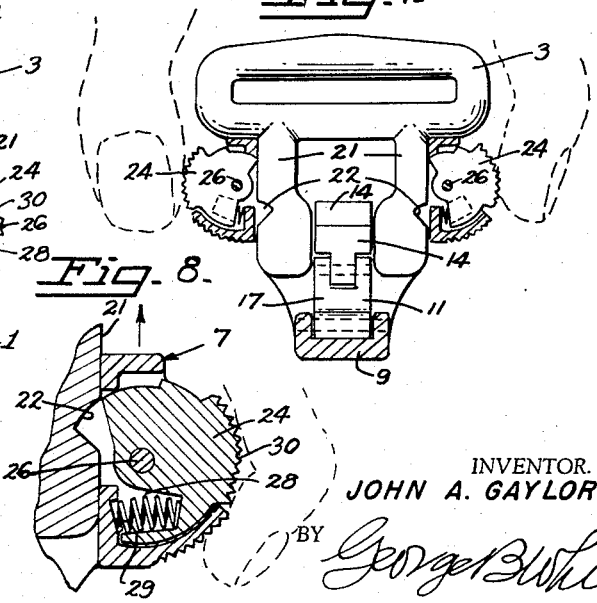
INVENTOR.
JOHN A. GAYLORD
BY
ATTORNEY.

July 21, 1959 — J. A. GAYLORD — 2,895,200
SNAP FASTENER FOR STRAPS AND THE LIKE
Filed Aug. 12, 1957 — 2 Sheets-Sheet 2
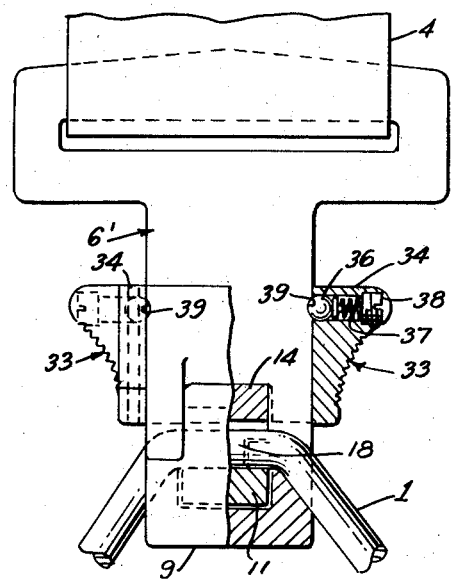
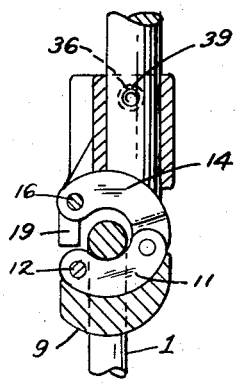
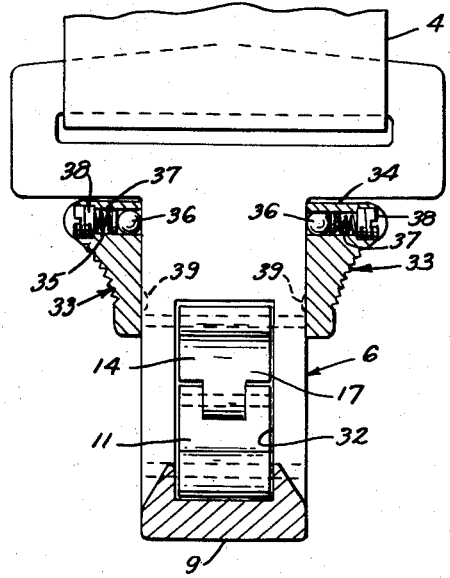
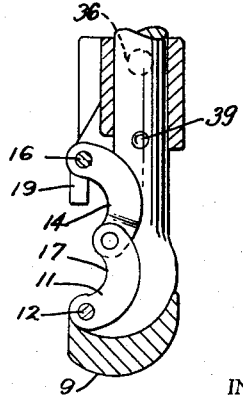
INVENTOR.
JOHN A. GAYLORD
BY
George B White
ATTORNEY

2,895,200
SNAP FASTENER FOR STRAPS AND THE LIKE

John A. Gaylord, San Rafael, Calif., assignor to H. Koch & Sons, Corte Madera, Calif., a partnership Application August 12, 1957, Serial No. 677,422

7 Claims. (Cl. 24—230)

This invention relates to a snap fastener for straps and the like.

The primary object of this invention is to provide snap fasteners which are separable and the opposite components of which are secured to the opposite straps or elements to be secured together, on one component of which there are provided pivoted jaws adapted to close upon the other component rapidly, means being provided for locking the said jaws automatically into closed position so as to positively maintain the components of the fastener in said closed position.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a front view of the snap fasteners in closed position.

Fig. 2 is a side view of the snap fastener in closed position.

Fig. 3 is a partly sectional view on a somewhat large scale, showing the fastener closed.

Fig. 4 is a partly sectional view showing the fastener open.

Fig. 5 is a partly sectional top plane view of the said fastener.

Fig. 6 is the fastener in closed position, one component shown partly in section to show the securing means.

Fig. 7 is a partly sectional view illustrating the manipulation of the fastener for opening the same.

Fig. 8 is a sectional detailed view of the securing means of the fastener in open position.

Fig. 9 is a partly sectional view of a modified form of the snap fastener.

Fig. 10 is a fragmental partly sectional view of this modified form.

Fig. 11 is a partly sectional front view of the modified form showing the fastener in open position, and Fig. 12 is a partly sectional fragmental view showing the modified form of the fastener in open position.

The fastener herein basically has to components: one is a ring or loop 1 to which may be secured a strap 2 or the like element to be fastened; the other component has a customary loop 3 secured to another strap 4 and a frame 6 on which the jaws and the manipulating elements generally denoted by the numeral 7 are adjustably mounted for engagement with the ring or loop 1.

The jaw and manipulating devices 7 in all the forms of the invention include a sleeve 8 slidable on the vertical frame 6. From the lower end of the vertical frame 6 extends forwardly an ear or lug 9 to the outer end of which is pivoted a lower link 11 generally arcuate. The inner face of the lug 9 is curved to form a nest for the lower link 11 in the closed position, as shown in Fig. 3. The lower link pivot 12 is forward of the plane of the vertical frame 6. A pivot 13 connects the lower link 11 to the lower end of the upper link 14 which upper link in turn is pivotally connected by a pivot pin 16 to the adjacent forward portion of the sliding sleeve 8. Thus when the sleeve 8 is pulled upwardly, it pulls the upper pivot 16 which projects the middle pivot 13 forwardly of the frame 6 and thereby opens the links 11 and 14 into the position shown in Fig. 4. The inner curvatures of the links 11 and 14 form sockets 17 generally fitting over the curvature of the top bar 18 of the ring 1.

As the ring top bar 18 is placed into the sockets 17 toward the position shown in Fig. 4 and then pressed inwardly and downwardly, it exerts a force on the lower link 11 rearwardly of the frame 6 and thereby pulls the free pivot 13 down on the frame 6. This results in pulling the sleeve 8 down so that the links 11 and 14 close into the position shown in Fig. 3 for securely holding the ring 1 in place. A tongue 19 extends downwardly from the upper end of the upper link 14, and closes the gap between the outer ends of the links 11 and 14, as shown in Fig. 3.

Various means may be provided for the purpose of locking this snap securely into the position shown in Fig. 3. For instance, in the first form shown in Figs. 1 to 8 inclusive, the vertical frame 6 has a pair of legs 21. On the outside edge of each leg 21 is a retainer or keeper notch 22. In the body of the sleeve 8 there are provided opposite brackets 23 which extend outwardly beyond the frame members 21. In each bracket 23 is pivoted a catch 24 on a pivot 26. On the catch 24 is a tooth 27 which fits into the keeper notch 22. The catch 24 is generally in the form of a disk. The inner portion of the disk below the pivot 26 has a socket 28 in which is located a spring 29 bearing against the inner wall of the bracket 23 so as to normally urge the catch 24 on each side toward the leg 21 into locking position. The outer and upper periphery of each catch 24 is provided with serrations 30 which can be engaged by the thumb or finger as illustrated in Figs. 7 and 8 so as to push the serrated portions downwardly into the position shown in Fig. 8 and thereby to disengage each tooth 27 from its keeper notch 22. Thus the sleeve 8 can be pulled up into the position shown in Fig. 7, thereby pulling the upper pivot 16 upwardly and opening the links 11 and 14 as shown in Fig. 4, and thus releasing the ring 1. The snap will remain in this open position until the ring is again pressed against inside portion 17 of the lower link 11 so as to pull the links together, in the manner heretofore described, into the closed position wherein the teeth 27 again automatically lock into their respective keeper notches 22 to hold the snap in locked position.

In the modified form shown in Figs. 9 to 12, the frame 6′ is made of a single depending body with a central slot or aperture 32 to accommodate the links 11 and 14 as heretofore described. The difference primarily resides in the structure of the sleeve 33 which in this instance is provided with lateral ears 34 in each of which is a hole 35 to contain at its inner end a ball catch 36 pressed by a spring 37 bearing against a removable outer plug 38. Each catch 36 is adapted to engage a keeper notch 39 in the adjacent side of the leg 6′, when the links 11 and 14 are locked together.

I claim:

1. A snap fastener for straps comprising a first loop adapted to be secured to a strap, a second loop adapted to be secured to another strap, a frame extended from said second loop, a slidable element on the frame, a link pivoted to said slidable element, a second link pivoted to said frame and to said first link, said links having concave portions forming complemental jaws adapted to receive and substantially surround a side of said first loop, and releasable means to fasten said slidable element to said frame in the closed position of said links.

2. A snap fastener for straps comprising a first loop adapted to be secured to a strap, a second loop adapted to be secured to another strap, a frame extended from said second loop, a slidable element on the frame, a pair of curved links pivoted together so that the concave sides of the links face toward one another to form jaws adapted to substantially surround a side of said first loop, one end of one of said links being pivoted to said frame and the other link being pivoted to said slidable element so that said links are moved apart or into closed position by the sliding of said slidable element respectively away from or toward said end pivoted on said frame, and means to automatically lock said slidable element to said frame when said links are closed over said first loop.

3. A snap fastener for straps comprising a first loop adapted to be secured to a strap, a second loop adapted to be secured to another strap, a frame extended from said second loop, a slidable element on the frame, a pair of curved links pivoted together so that the concave sides of the links face toward one another to form jaws adapted to substantially surround a side of said first loop, one end of one of said links being pivoted to said frame and the other link being pivoted to said slidable element so that said links are moved apart or into closed position by the sliding of said slidable element respectively away from or toward said end pivoted on said frame, and means to automatically lock said slidable element to said frame when said links are closed over said first loop, and means for releasing said locking means at will.

4. A snap fastener for straps comprising a first loop adapted to be secured to a strap, a second loop adapted to be secured to another strap, a frame extended from said second loop, a slidable element on the frame, a pivot bearing extended from said frame offset to one side of said frame, a pivot projection extended from said slidable element offset to the same side of said frame as said pivot bearing and generally aligned with the same, a link pivoted to said pivot bearing and a second link pivoted to said pivot projection, said links being pivoted together on a pivot generally intermediate between said pivot bearing and said pivot projection and having concave portions facing toward the same side of said frame to which said pivot bearing and projection are offset, the relative position of said pivots being such that pull exerted by said first loop upon the concave portion of the link adjacent said pivot bearing pulls said slidable element toward said pivot bearing for closing said links upon said first loop, and releasable means to automatically lock said slidable sleeve to said frame when said links are closed.

5. A snap fastener for straps comprising a first loop adapted to be secured to a strap, a second loop adapted to be secured to another strap, a frame extended from said second loop, a slidable element on the frame, a pivot bearing extended from said frame offset to one side of said frame, a pivot projection extended from said slidable element offset to the same side of said frame as said pivot bearing and generally aligned with the same, a link pivoted to said pivot bearing and a second link pivoted to said pivot projection, said links being pivoted together on a pivot generally intermediate between said pivot bearing and said pivot projection and having concave portions facing toward the same side of said frame to which said pivot bearing and projection are offset, the relative position of said pivots being such that pull exerted by said first loop upon the concave portion of the link adjacent said pivot bearing pulls said slidable element toward said pivot bearing for closing said links upon said first loop, and releasable means to automatically lock said slidable sleeve to said frame when said links are closed, and a lip extended from said pivot projection toward said pivot bearing to cover the gap between the relatively movable ends of the links.

6. A snap fastener for straps comprising a first loop adapted to be secured to a strap, a second loop adapted to be secured to another strap, a frame extended from said second loop, a slidable element on the frame, a pivot bearing extended from said frame offset to one side of said frame, a pivot projection extended from said slidable element offset to the same side of said frame as said pivot bearing and generally aligned with the same, a link pivoted to said pivot bearing and a second link pivoted to said pivot projection, said links being pivoted together on a pivot generally intermediate between said pivot bearing and said pivot projection and having concave portions facing toward the same side of said frame to which said pivot bearing and projection are offset, the relative position of said pivots being such that pull exerted by said first loop upon the concave portion of the link adjacent said pivot bearing pulls said slidable element toward said pivot bearing for closing said links upon said first loop, and releasable means to automatically lock said slidable element to said frame when said links are closed, said releasable locking means including a keeper formed in said frame, a bolt member in said slidable element, resilient means to urge said bolt member into said keeper, said keeper being spaced from said pivot bearing at the same distance as the spacing between said bolt and said pivot bearing when the slidable element is in link closing position.

7. A snap fastener for straps comprising a first loop adapted to be secured to a strap, a second loop adapted to be secured to another strap, a frame extended from said second loop, a slidable element on the frame, a pivot bearing extended from said frame offset to one side of said frame, a pivot projection extended from said slidable element offset to the same side of said frame as said pivot bearing and generally aligned with the same, a link pivoted to said pivot bearing and a second link pivoted to said pivot projection, said links being pivoted together on a pivot generally intermediate between said pivot bearing and said pivot projection and having concave portions facing toward the same side of said frame to which said pivot bearing and projection are offset, the relative position of said pivots being such that pull exerted by said first loop upon the concave portion of the link adjacent said pivot bearing pulls said slidable element toward said pivot bearing for closing said links upon said first loop, and releasable means to automatically lock said slidable sleeve to said frame when said links are closed, said releasable locking means including a keeper formed in said frame, a bolt member in said slidable element, resilient means to urge said bolt members into said keeper, said keeper being spaced from said pivot bearing at the same distance as the spacing between said bolt and said pivot bearing when the slidable element is in link closing position, and manipulating means connected to said bolt member for releasing said bolt member from said keeper to permit sliding of said slidable element into link opening position.

References Cited in the file of this patent

UNITED STATES PATENTS

| | | |
|---|---|---|
| 1,209,369 | Wood | Dec. 19, 1916 |
| 1,650,038 | Potter | Nov. 22, 1927 |
| 2,568,939 | Wilson | Sept. 25, 1951 |

FOREIGN PATENTS

| | | |
|---|---|---|
| 216,206 | Germany | Nov. 8, 1909 |
| 999,825 | France | Oct. 10, 1951 |